United States Patent
Whittle et al.

(10) Patent No.: US 11,193,393 B2
(45) Date of Patent: Dec. 7, 2021

(54) TURBINE SECTION ASSEMBLY WITH CERAMIC MATRIX COMPOSITE VANE

(71) Applicant: Rolls-Royce plc, London (GB)

(72) Inventors: Michael J. Whittle, London (GB);
Anthony G. Razzell, London (GB);
Roderick M. Townes, London (GB);
David J. Shepherd, London (GB);
Duncan Forbes, London (GB)

(73) Assignee: Rolls-Royce plc

( * ) Notice: Subject to any disclaimer, the term of this patent is extended or adjusted under 35 U.S.C. 154(b) by 295 days.

(21) Appl. No.: 16/391,827

(22) Filed: Apr. 23, 2019

(65) Prior Publication Data
US 2020/0340370 A1 Oct. 29, 2020

(51) Int. Cl.
*F01D 25/24* (2006.01)
*F01D 9/04* (2006.01)

(52) U.S. Cl.
CPC ........... *F01D 25/246* (2013.01); *F01D 9/041* (2013.01); *F01D 9/042* (2013.01); *F05D 2240/12* (2013.01); *F05D 2240/14* (2013.01); *F05D 2240/80* (2013.01); *F05D 2260/30* (2013.01); *F05D 2300/6033* (2013.01)

(58) Field of Classification Search
CPC ..... F01D 9/00; F01D 9/02; F01D 9/04; F01D 9/041; F01D 9/042; F01D 25/24; F01D 25/243; F01D 25/246; F05D 2240/12; F05D 2240/14; F05D 2240/80; F05D 2260/30; F05D 2300/6033
See application file for complete search history.

(56) References Cited

U.S. PATENT DOCUMENTS

| | | | |
|---|---|---|---|
| 4,979,872 A * | 12/1990 | Myers | F01D 9/065 403/131 |
| 5,078,576 A | 1/1992 | Hayton | |
| 6,325,593 B1 | 12/2001 | Darkins, Jr. et al. | |
| 6,514,046 B1 | 2/2003 | Morrison et al. | |
| 6,558,114 B1 | 5/2003 | Tapley et al. | |
| 6,648,597 B1 | 11/2003 | Widrig et al. | |
| 6,860,716 B2 | 3/2005 | Czachor et al. | |
| 6,884,030 B2 | 4/2005 | Darkins, Jr. et al. | |
| 7,588,414 B2 | 9/2009 | Wunderlich et al. | |
| 7,762,766 B2 | 7/2010 | Shteyman et al. | |
| 8,371,127 B2 | 2/2013 | Durocher et al. | |
| 8,454,303 B2 | 6/2013 | Garcia-Crespo | |
| 9,097,141 B2 | 8/2015 | Paradis | |
| 9,546,557 B2 | 1/2017 | Grooms, III et al. | |
| 9,890,663 B2 | 2/2018 | Scott | |
| 9,915,159 B2 | 3/2018 | Huizenga et al. | |
| 10,054,009 B2 | 8/2018 | Scott | |
| 10,174,627 B2 | 1/2019 | Chang et al. | |
| 2004/0253096 A1 | 12/2004 | Legg | |
| 2013/0067930 A1* | 3/2013 | Paradis | F01D 25/243 60/796 |
| 2014/0234118 A1 | 8/2014 | Beaujard et al. | |

(Continued)

*Primary Examiner* — Christopher Verdier
*Assistant Examiner* — Elton K Wong
(74) *Attorney, Agent, or Firm* — Barnes & Thornburg LLP

(57) ABSTRACT

A turbine assembly adapted for use in a gas turbine engine with a turbine vane comprising ceramic matrix composite materials. The turbine vane is configured to redirect air moving through a primary gas path of the gas turbine engine. The turbine assembly includes a vane-stage support for holding the turbine vane in place relative to a turbine case.

20 Claims, 4 Drawing Sheets

(56) References Cited

U.S. PATENT DOCUMENTS

| | | |
|---|---|---|
| 2014/0255174 A1 | 9/2014 | Duelm et al. |
| 2015/0330244 A1* | 11/2015 | Vo .......................... F01D 25/28 |
| | | 415/173.5 |
| 2016/0123163 A1 | 5/2016 | Freeman et al. |
| 2016/0123164 A1* | 5/2016 | Freeman ................ F01D 5/284 |
| | | 415/200 |
| 2016/0177761 A1 | 6/2016 | Huizenga et al. |
| 2016/0201488 A1 | 7/2016 | Carr et al. |
| 2017/0022833 A1 | 1/2017 | Heitman et al. |
| 2017/0030223 A1* | 2/2017 | Parry ..................... F01D 25/24 |
| 2017/0051619 A1 | 2/2017 | Tuertscher |
| 2018/0045117 A1 | 2/2018 | Groves, II et al. |
| 2018/0223680 A1 | 8/2018 | Hafner |
| 2018/0238181 A1 | 8/2018 | Reynolds et al. |
| 2018/0238184 A1 | 8/2018 | Reynolds et al. |
| 2018/0328187 A1 | 11/2018 | Oke |
| 2018/0340431 A1 | 11/2018 | Kerns et al. |
| 2018/0370158 A1 | 12/2018 | Gallier et al. |

* cited by examiner

TURBINE SECTION ASSEMBLY WITH CERAMIC MATRIX COMPOSITE VANE

FIELD OF THE DISCLOSURE

The present disclosure relates generally to gas turbine engines, and specifically to turbine sections of such engines. More specifically, the present disclosure relates to turbine sections of gas turbine engines incorporating ceramic matrix composite vanes.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine assembly adapted for use in a gas turbine engine with a turbine vane comprising ceramic matrix composite materials configured to redirect air moving through a primary gas path of the gas turbine engine may include a turbine case, a vane stage, and a vane-stage support. The turbine case may be arranged around a central axis.

In some embodiments, the turbine case may include a forward casing and an aft casing. The forward casing may have an annular shell and a forward flange that extends radially outwardly from the annular shell. The aft casing may have an annular shell and an aft flange that extends radially outwardly from the annular shell.

In some embodiments, the vane stage may include the turbine vane comprising ceramic matrix composite materials and an inner vane seal land. The turbine vane may be shaped to form an airfoil that extends across the primary gas path of the gas turbine engine. The inner vane seal land may be located radially inward of the turbine vane. The inner vane seal land may be configured to be engaged by a rotating component to create a seal separating pressure zones within the gas turbine engine when the turbine assembly is used in the gas turbine engine.

In some embodiments, the vane-stage support may comprise metallic materials and may be configured to hold the turbine vane and the inner vane seal land in place relative to the turbine case. The vane-stage support may include a case mount and a spar. The case mount may be arranged between the forward flange of the forward casing and the aft flange of the aft casing. The spar may extend from the case mount radially through the airfoil of the turbine vane. In some embodiments, the turbine vane and the inner vane seal land may engage the spar so that forces applied to the vane stage are carried by the spar to the case mount and case during use of the turbine assembly in the gas turbine engine.

In some embodiments, the case mount may include a coupling flange, a retainer ring, and a plurality of clamp fasteners. The coupling flange may be arranged between the forward flange of the forward casing and the aft flange of the aft casing. The retainer ring may be spaced axially from the coupling flange with a portion of the spar sandwiched therebetween. The plurality of clamp fasteners may be configured to clamp the spar between the coupling flange and the retainer ring. In some embodiments, the plurality of clamp fasteners may extend through the portion of the spar sandwiched between the coupling flange and the retainer ring.

In some embodiments, the vane-stage support may include a plurality of case fasteners that extend through the forward flange of the forward casing, the aft flange of the aft casing, and the coupling flange of the case mount. The plurality of case fasteners may be configured to clamp the coupling flange between the forward flange of the forward casing and the aft flange of the aft casing.

In some embodiments, the retainer ring may engage a radially-inner diameter of the case at a location spaced axially from the coupling flange so as to carry cantilevered forces from the vane stage to the case during use of the turbine assembly in the gas turbine engine. In some embodiments, the retainer ring may be spaced axially downstream along the primary gas path from the coupling flange. In some embodiments, the plurality of clamp fasteners may extend through the portion of the spar sandwiched between the coupling flange and the retainer ring.

In some embodiments, the spar of the vane-stage support may include a rod, an outer load transfer collar, and an inner load transfer collar. The rod may extend radially through the airfoil of the turbine vane. The outer load transfer collar may extend axially forward and aft of the rod and contact the turbine vane. The inner load transfer collar may be spaced radially inwardly from the outer load transfer collar and may extend axially forward and aft of the rod and contacts the turbine vane.

In some embodiments, the case mount may include a coupling flange and a retainer ring. The coupling flange may be arranged between the forward flange of the forward casing and the aft flange of the aft casing. The retainer ring may be spaced axially from the coupling flange with a portion of the spar sandwiched therebetween. In some embodiments, the portion of the rod included in the spar may be trapped between the coupling flange and the retainer ring to fix the spar to the case mount. In some embodiments, the case mount may include a plurality of clamp fasteners configured to clamp the portion of the rod included in the spar between the coupling flange and the retainer ring.

According to another aspect of the present disclosure, a turbine assembly adapted for use in a gas turbine engine may include a turbine case, a turbine vane, an inner vane seal land, and a vane-stage support. The turbine case may be arranged around a central axis. The turbine vane may comprise ceramic matrix composite materials and may be shaped to form an airfoil. The inner vane seal land may be located radially inward of the turbine vane. The vane-stage support may be configured to hold the turbine vane and the inner vane seal land in place relative to the turbine case.

In some embodiments, the turbine case may include a forward casing and an aft casing. The forward casing may have a forward flange that extends radially outwardly. The aft casing may have an aft flange that extends radially outwardly.

In some embodiments, the vane-stage support may include a case mount and a spar. The case mount may be clamped between the forward flange of the forward casing and the aft flange of the aft casing. The spar may extend from the case mount radially through the airfoil of the turbine vane to the inner vane seal land. In some embodiments, the spar may support the inner vane seal land so that forces applied to the inner vane seal land are carried by the spar to the case mount and case during use of the turbine assembly in the gas turbine engine.

In some embodiments, the case mount may include a coupling flange and a retainer ring. The coupling flange may be arranged between the forward flange of the forward casing and the aft flange of the aft casing. The retainer ring may be spaced axially from the coupling flange with a portion of the spar sandwiched therebetween.

In some embodiments, the case mount may further include a plurality of clamp fasteners. The plurality of clamp fasteners may extend through the forward flange of the forward casing, the aft flange of the aft casing, and the portion of the spar sandwiched between the coupling flange and the retainer ring.

In some embodiments, the vane-stage support may include a plurality of case fasteners. The plurality of case fasteners may extend through the forward flange of the forward casing, the aft flange of the aft casing, and the coupling flange of the case mount. The case fasteners may be configured to clamp the coupling flange between the forward flange of the forward casing and the aft flange of the aft casing.

In some embodiments, the retainer ring may engage a radially-inner diameter of the case at a location spaced axially from the coupling flange. In some embodiments, the retainer ring may be spaced axially downstream along a primary gas path of the gas turbine engine from the coupling flange.

In some embodiments, the spar of the vane-stage support may include a rod and load-transfer features. The rod may extend radially through the airfoil of the turbine vane. The load-transfer features may extend axially from the rod to engage the turbine vane and carry load from the turbine vane to the case mount and the case.

In some embodiments, the case mount may include a coupling flange and a retainer ring. The coupling flange may be arranged between the forward flange of the forward casing and the aft flange of the aft casing. The retainer ring may be spaced axially from the coupling flange with a portion of the spar sandwiched therebetween. In some embodiments, a portion of the rod included in the spar may be trapped between the coupling flange and the retainer ring to fix the spar to the case mount.

In some embodiments, the case mount may include a plurality of clamp fasteners. The case fasteners may be configured to clamp the portion of the rod included in the spar between the coupling flange and the retainer ring. In some embodiments, the retainer ring may engage a radially-inner diameter of the case at a location spaced axially downstream along a primary gas path of the gas turbine engine from the coupling flange.

These and other features of the present disclosure will become more apparent from the following description of the illustrative embodiments.

DETAILED DESCRIPTION OF THE DRAWINGS

Figure 1:
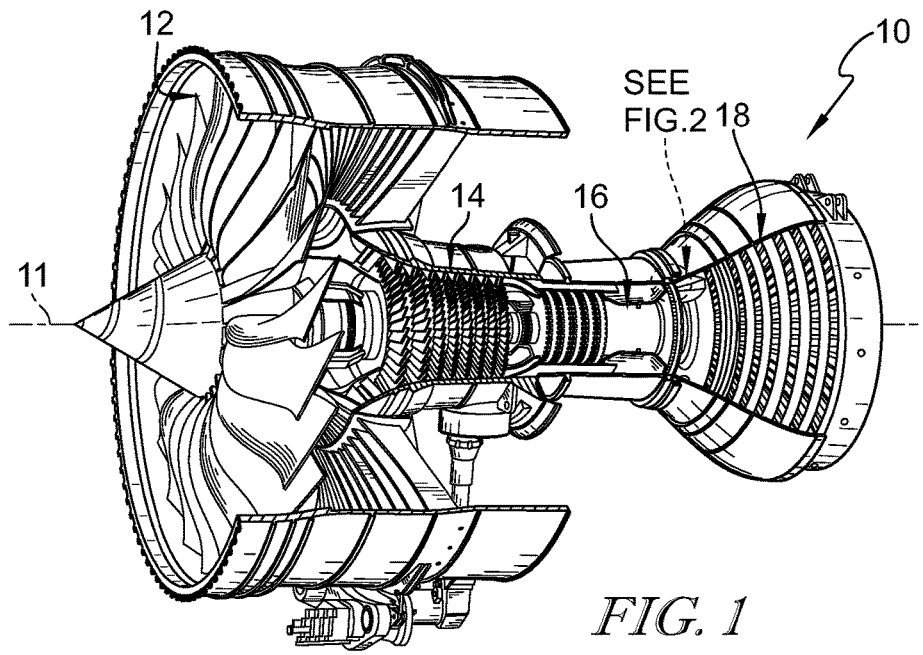
FIG. 1 is a cutaway view of a gas turbine engine that includes a fan, a compressor, a combustor, and a turbine assembly in accordance with the present disclosure that is adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
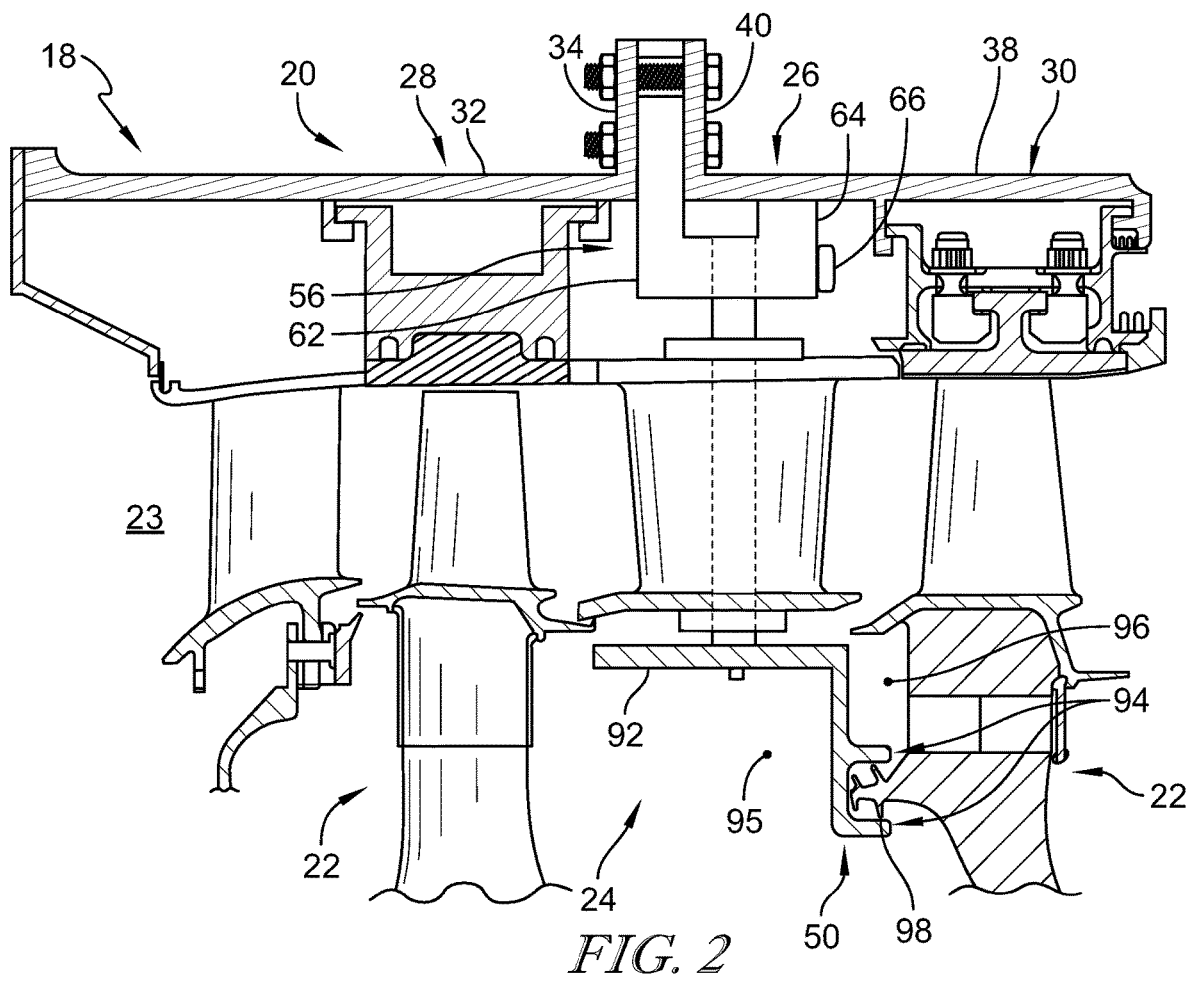
FIG. 2 is a cross sectional view of a portion of the turbine assembly of the gas turbine engine of FIG. 1 showing that the turbine assembly includes a turbine case, a plurality of turbine wheel assemblies, a vane stage made up of a vane with an airfoil and an inner vane seal land engaged by a seal rotor included in a turbine wheel assembly, and a vane-stage support that holds the vane stage in place relative to the turbine case.

A turbine assembly 18 according to the present disclosure is adapted for use in a gas turbine engine 10 as suggested in FIGS. 1 and 2. The gas turbine engine 10 includes a fan 12, a compressor 14, a combustor 16, and the turbine assembly 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine assembly 18 includes a turbine case 20, a plurality of turbine wheel assemblies 22, a vane stage 24, and a vane-stage support 26 as shown in FIG. 2. The turbine case 20 is arranged around a central reference axis 11. Each turbine wheel assembly 22 is configured to interact with the hot combustion gases from the combustor 16 and rotate about a center axis 11 of the gas turbine engine 10 to generate power for driving the compressor 14 and/or the fan 12. The vane stage 24 is located between the turbine wheel assemblies 22 and includes (i) a turbine vane 44 configured to redirect air moving through a primary gas path 23 of the gas turbine engine 10 and (ii) an inner vane seal land 46 that is engaged by a seal rotor 98 to seal compartments within the turbine assembly 18. The vane-stage support 26 is configured to hold the turbine vane 44 and an inner vane seal land 46 included in the vane stage 24 in place relative to the turbine case 20.

In the illustrative embodiment, the turbine vane 44 included in the vane stage 24 comprises ceramic matrix materials while the vane-stage support 26 comprises metallic materials. The ceramic matrix composite vane 44 is adapted to withstand high temperatures, but may have relatively low strength compared to the metallic vane-stage support 26. The vane-stage support 26 provides structural strength to the vane stage components 44, 46 by receiving the force loads, such as the aerodynamic loads applied to the vane 44 and the axial loads applied to the inner vane seal land 46, and transferring the loads directly from the vane-stage support 26 out through the casing 20.

Figure 3:
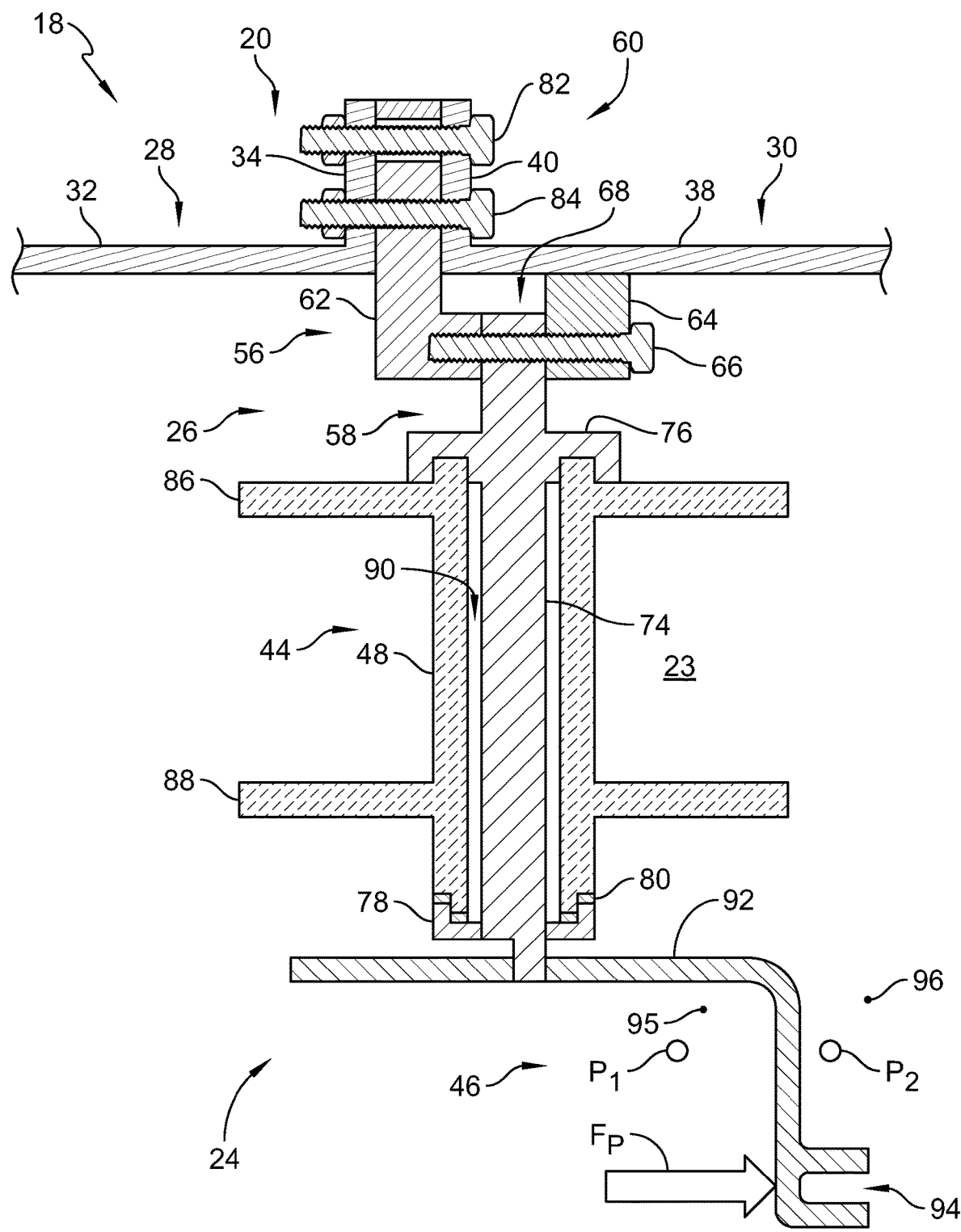
FIG. 3 is a detail view of the turbine assembly of FIG. 2 showing vane-stage support includes a case mount arranged between forward and aft flanges of the turbine case, a spar that extends from the case mount radially through an airfoil of the turbine vane stage to the inner vane seal land to transmit forces applied to the vane stage to the case mount and out through the turbine case.

The turbine case 20 includes a forward casing 28 and an aft casing 30 as shown in FIGS. 2 and 3. The forward casing 28 includes a forward annular shell 32 and a forward flange 34 that extends radially outwardly from the annular shell 32. The aft casing 30 includes an aft annular shell 38 and an aft flange 40 that extends radially outwardly from the annular shell 38.

The vane stage 24 includes the turbine vane 44 and the inner vane seal 46 land as shown in FIGS. 2 and 3. The turbine vane 44 comprising ceramic matrix composite materials is shaped to form an airfoil 48 that extends across the primary gas path 23 of the gas turbine engine. The inner vane seal land 46 is located radially inward of the turbine vane 44 and is configured to be engaged by a rotating component 98 to create a compartment seal 50 separating pressure zones P1 and P2 within the gas turbine engine 10 when the turbine assembly 18 is used in the gas turbine engine 10. The difference of pressure causes a pressure force Fp to act on the inner vane seal land 46, which results in an axial moment in the turbine assembly 18.

The vane-stage support 26 includes a case mount 56, a spar 58, and a plurality of case fasteners 60 as shown in FIG. 3. The case mount 56 is arranged between the forward flange 34 of the forward casing 28 and the aft flange 40 of the aft casing 30. The spar 58 extends from the case mount 56 radially inward through the airfoil 48 of the turbine vane 44 included in the vane stage 24. The plurality of case fasteners 60 extend through the forward flange 34 of the forward casing 28, the aft flange 40 of the aft casing 30, and a coupling flange 62 of the case mount 56 and are configured to clamp the coupling flange 62 between the forward flange 34 of the forward casing 28 and the aft flange 40 of the aft casing 30 to couple the case mount 56 directly to the turbine case 20. In the illustrative embodiment, the plurality of case fasteners 60 are securing bolts. In other embodiments, other suitable fasteners may be used, such as pins.

In the illustrative embodiment, the turbine vane 44 and the inner vane seal land 46 engage the spar 58 so that forces applied to the vane stage 24 are carried by the spar 58 to the case mount 56 and case 20 during use of the turbine assembly 18 in the gas turbine engine 10. The turbine vane 44 engages the spar 58 at both radially inner and outer ends of the turbine vane 44 outside the primary gas path 23 to transfer aerodynamic loads applied to the airfoil 48 from the spar 58 directly to the turbine case 20. The inner vane seal land 46 engages the spar 58 radially inward of the vane 44 to transfer axial loads, such as the pressure force Fp applied to the seal land 46 from the spar 58 directly to the turbine case 20.

In the illustrative embodiment, the case mount 56 and the spar 58 are individually machined components and assembled as shown in FIG. 3. In other embodiments, the case mount 56 and the spar 58 may be integrally formed such that the case mount 56 and the spar 58 are included in a one-piece support component.

The case mount 56 includes the coupling flange 62, a retainer ring 64, and a plurality of clamp fasteners 66 as shown in FIG. 3. The coupling flange 62 is arranged between the forward flange 34 of the forward casing 28 and the aft flange 40 of the aft casing 30. The retainer ring 64 is spaced axially from the coupling flange 62 with a portion of the spar 58 sandwiched therebetween. The plurality of clamp fasteners 66 are configured to clamp the spar 58 between the coupling flange 62 and the retainer ring 64. In the illustrative embodiment, the plurality of clamp fasteners 66 extend through the portion of the spar 58 sandwiched between the coupling flange 62 and the retainer ring 64.

In the illustrative embodiment, the retainer ring 64 engages a radially-inner diameter of the turbine case 20 at a location spaced axially from the coupling flange 62 so as to carry cantilevered forces from the vane stage 24 to the case 20 during use of the turbine assembly 18 in the gas turbine engine 10. The retainer ring 64 is spaced axially downstream along the primary gas path 23 from the coupling flange 62 to form a cavity 68 between the case 20 and the case mount 56. The cavity 68 may be supplied cooling air which can be used to cool the turbine assembly 18. In the illustrative embodiment, the cavity 68 is annular and extends around the axis 11.

The spar 58 includes a rod 74, an outer load transfer collar 76, and an inner load transfer collar 78 as shown in FIG. 3. The rod 74 extends radially through the airfoil 48 of the turbine vane 44. In some embodiments, the rod 74 may be hollow and include cooling holes to transmit cooling air from the cavity 68 to the vane 44 and/or into the inter-disk cavity between the turbine wheels 22. The outer load transfer collar 76 extends axially forward and aft of the rod 74 and contacts the turbine vane 44 at a radially outer end of the turbine vane 44. The inner load transfer collar 78 is spaced radially inwardly from the outer load transfer collar 76 and extends axially forward and aft of the rod 74 and contacts the turbine vane 44 a radially inner end of the turbine vane 44.

In the illustrative embodiment, the outer load transfer collar 76 contacts the turbine vane 44 at the radially outer end of the turbine vane 44 to transfer aerodynamic loads applied to the vane 44 from the vane 44 to the spar 58. The outer load transfer collar 76 contacts the turbine vane 44 at the radially outer end of the vane 44 so that the loads are transferred from the vane 44 to the vane-stage support 26 outside of the primary gas path 23.

Similarly, the inner load transfer collar 78 contacts the turbine vane 44 at the radially inner end of the turbine vane 44 to transfer aerodynamic loads applied to the vane 44 from the vane 44 to the spar 58. The inner load transfer collar 78 contacts the turbine vane 44 at the radially inner end of the vane 44 so that the loads are transferred from the vane 44 to the vane-stage support 26 outside of the primary gas path 23.

In the illustrative embodiment the outer load transfer collar 76 is integrally formed with the rod 74 such that the rod 74 and the outer load transfer collar 76 are included in a one-piece support component. The inner load transfer collar 78 is a separate component assembled onto the rod 74 and fixed to the rod 74 by a suitable fastener such as a screwed joint, collet arrangement, clamp, or other suitable fastener. In some embodiments, the inner load transfer collar 78 is integrally formed with a portion of the inner vane seal land 46. In other embodiments, the outer load transfer collar 76 may be formed separately from the rod 74 and assembled to form the spar 58.

In the illustrative embodiment, a compliant layer 80 is arranged between the radially inner end of the turbine vane 44 and the inner load transfer collar 78 like as shown in FIG. 3. The compliant layer 80 is configured to seal between the radially inner end of the turbine vane 44 and the inner load transfer collar 78. The compliant layer 80 is also configured to allow radial movement of the turbine vane 44 relative to the vane-stage support 26 in response to thermal growth mismatch between the vane 44 and the vane-stage support 26 caused by different coefficients of thermal expansion of the vane 44 and the support 26 during use of the turbine assembly 18.

The plurality of case fasteners 60 includes a radially outer securing bolt 82 and a radially inner securing bolt 84 as shown in FIG. 3. The radially inner securing bolt 84 is spaced radially inward of the radially outer securing bolt 82. Each securing bolt 82, 84 extends through the forward flange 34 of the forward casing 28, the aft flange 40 of the aft casing 30, and the coupling flange 62 of the case mount 56. At the outer securing bolt 82 does not interface with the coupling flange 62 and instead the compressive force loads applied by the outer and inner securing bolts 82, 84 secured the case mount 56 to the case 20.

Turning again to the vane stage 24, the turbine vane 44 includes the airfoil 48, an outer end wall 86, and an inner end wall 88 as shown in FIG. 3. The inner end wall 88 is spaced radially inward of the outer end wall 86. The airfoil 48 extends between and interconnects the outer end wall 86 and the inner end wall 88. The airfoil 48 is shaped to redirect air moving along the primary gas path 23 of the turbine assembly 18 that extends radially from the outer end wall 86 to the inner end wall 88. The airfoil 48 is also shaped to include a vane cavity 90 extending radially through the airfoil 48 and opens at the inner and outer end walls 84, 86. The outer end wall 86 defines a radially outer boundary of the primary gas path 23 and the inner end wall 88 defines a radially inner boundary of the primary gas path 23.

In the illustrative embodiment, the outer end wall 86, inner end wall 88, and the airfoil 48 of the vane 44 are integrally formed from ceramic matrix composite materials such that the outer end wall 86, inner end wall 88, and the airfoil 48 are included in a one-piece vane component as shown in FIGS. 2 and 3. In other embodiments, the outer end wall 86, inner end wall 88, and the airfoil 48 may be formed as separate components.

The inner vane seal land 46 includes a seal panel 92 and seal lands 94 as shown in FIGS. 2 and 3. The seal panel 92 divides the inter-disk cavity into axially adjacent compartments 95, 96 within the turbine assembly 18. The seal lands 94 extend axially aft and away from the seal panel 92. At least one seal land 94 is engaged by a rotatable seal element 98 of the turbine wheel 22 as shown in FIG. 2. In the illustrative embodiment, both seal lands 94 are engaged with the rotating seal element 98 to form the compartment seal 50 between the upstream and downstream turbine wheel assemblies 22. In some embodiments, the inner load transfer collar 78 is integrally formed with the seal panel 92 of the inner vane seal land 46.

The compartment seal 50 between the upstream and downstream turbine wheel assemblies 22 results in a first pressure P1 on the upstream turbine wheel side and a second pressure P2 on the downstream turbine wheel side. In the illustrative embodiment, the first pressure P1 is greater than the second pressure P2 resulting in a difference of pressure on either side of the inner vane seal land 46. The difference of pressure causes the pressure force Fp to act on the inner vane seal land 46 as shown in FIG. 3. The pressure force Fp results in an axial moment in the turbine assembly 18.

In the illustrative embodiment, the rod 74 of the spar 58 supports the inner vane seal land 46 so that forces applied to the inner vane seal land 46 are carried by the spar 58 to the case mount 56 and the case 20 during use of the turbine assembly 18. A portion of the rod 74 included in the spar 58 is trapped between the coupling flange 62 and the retainer ring 64 to fix the spar 58 to the case mount 56. The plurality of clamp fasteners 66 are configured to clamp the portion of the rod 74 included in the spar 58 between the coupling flange 62 and the retainer ring 64.

Figure 4:
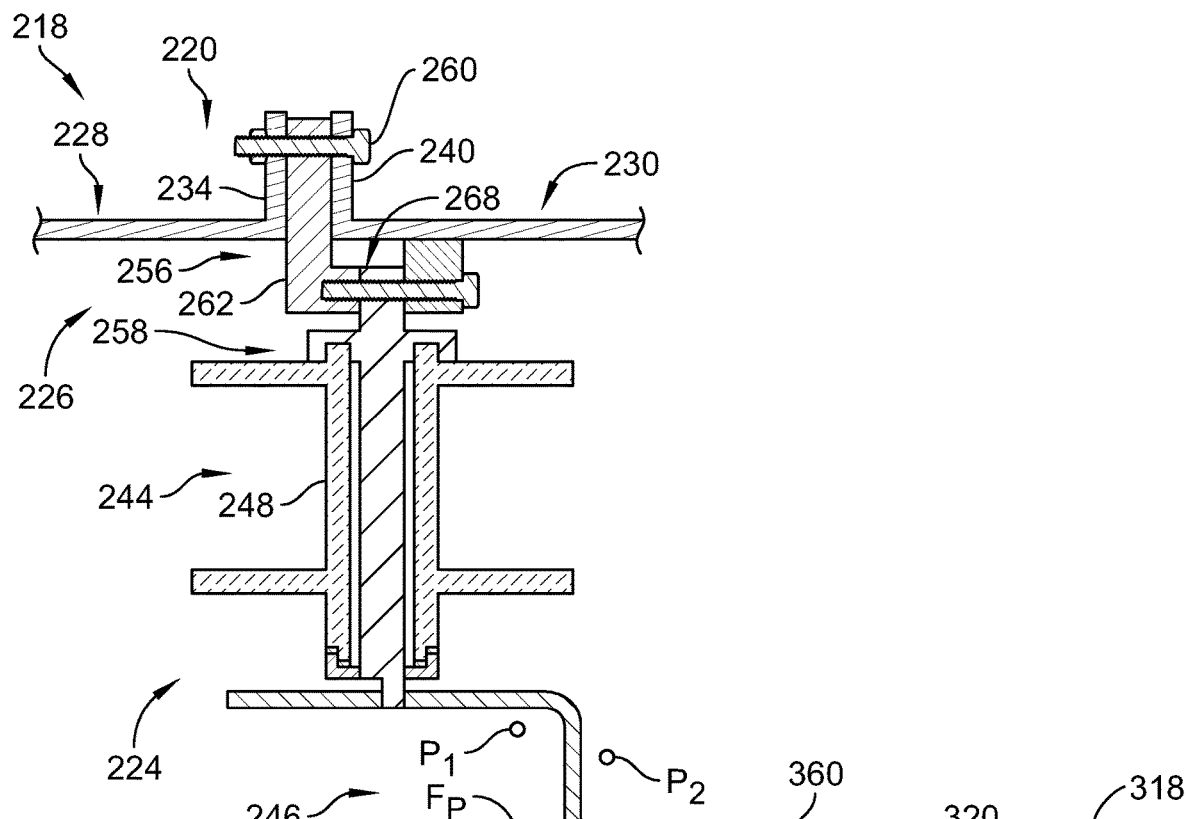
FIG. 4 is a detail view of another embodiment of a vane-stage support that may be included in the turbine assembly of FIG. 2 showing that the vane-stage support includes a case mount arranged between forward and aft flanges of the turbine case, a spar that extends from the case mount radially through an airfoil of the turbine vane stage, and a single case fastener that couples the case mount directly to the case.

Another embodiment of a turbine assembly 218 in accordance with the present disclosure is shown in FIG. 4. The turbine assembly 218 is substantially similar to the turbine assembly 18 shown in FIGS. 1-3 and described herein. Accordingly, similar reference numbers in the 200 series indicate features that are common between the turbine assembly 18 and the turbine assembly 218. The description of the turbine assembly 18 is incorporated by reference to apply to the turbine assembly 218, except in instances when it conflicts with the specific description and the drawings of the turbine assembly 218.

The turbine assembly 218 includes a turbine case 220, a vane stage 224, and a vane-stage support 226 as shown in FIG. 4. The vane stage 224 is located between the turbine wheel assemblies 22 and includes a turbine vane 244 configured to redirect air received from an upstream turbine wheel assembly 22 moving through a primary gas path 23 of the gas turbine engine 10 toward a downstream turbine wheel assembly 22. The vane-stage support 226 is configured to hold the turbine vane 244 and an inner vane seal land 246 included in the vane stage 224 in place relative to the turbine case 220.

The vane-stage support 226 includes a case mount 256, a spar 258, and a case fastener 260 as shown in FIG. 4. The case mount 256 is arranged between a forward flange 234 of a forward casing 228 and an aft flange 240 of an aft casing 230 included in the turbine case 220. The spar 258 extends from the case mount 256 radially inward through an airfoil 248 of the turbine vane 244 included in the vane stage 224.

The case fastener 260 extends through the forward flange 234 of the forward casing 228, the aft flange 240 of the aft casing 230, and a coupling flange 262 of the case mount 256 and is configured to clamp the coupling flange 262 between the forward flange 234 of the forward casing 228 and the aft flange 240 of the aft casing 230 to couple the case mount 256 directly to the turbine case 220. In the illustrative embodiment, the case fastener 260 is a securing bolt. In other embodiments, other suitable fasteners may be used, such as a pin.

Figure 5:
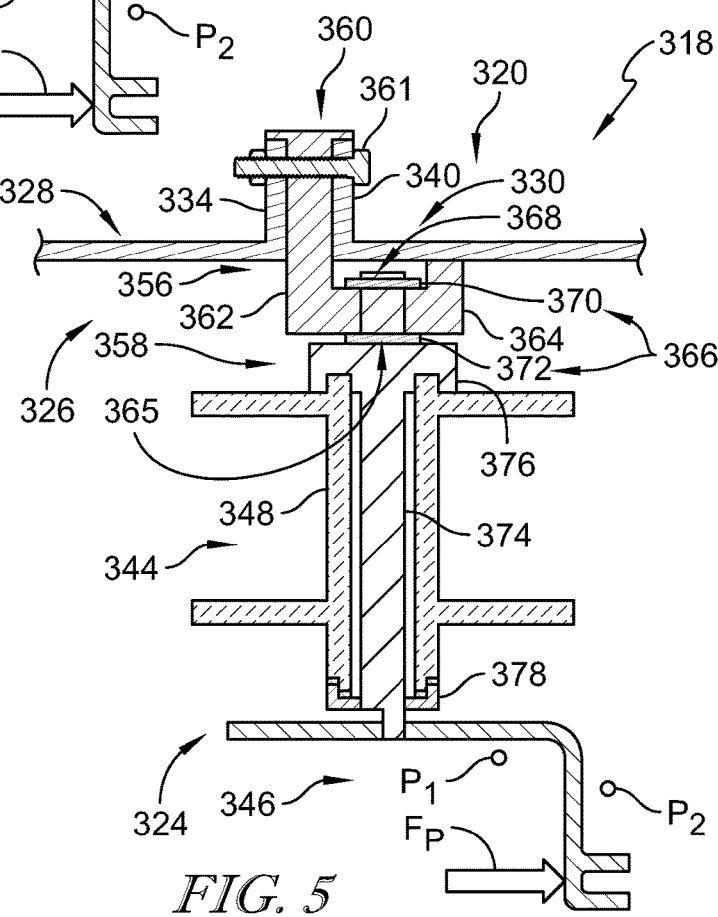
FIG. 5 is a detail view of another embodiment of a vane-stage support that may be included in the turbine assembly of FIG. 2 showing that the vane-stage support includes a case mount arranged between forward and aft flanges of the turbine case, a spar, and a case fastener that extends axially forward and aft from the case mount and engages the forward and aft flanges of the turbine case to couple the case mount to the turbine case.

Another embodiment of a turbine assembly 318 in accordance with the present disclosure is shown in FIG. 5. The turbine assembly 318 is substantially similar to the turbine assembly 18 shown in FIGS. 1-3 and described herein. Accordingly, similar reference numbers in the 300 series indicate features that are common between the turbine assembly 18 and the turbine assembly 318. The description of the turbine assembly 18 is incorporated by reference to apply to the turbine assembly 318, except in instances when it conflicts with the specific description and the drawings of the turbine assembly 318.

The turbine assembly 318 includes a turbine case 320, a vane stage 324, and a vane-stage support 326 as shown in FIG. 5. The vane stage 324 is located between the turbine wheel assemblies 22 and includes a turbine vane 344 configured to redirect air received from an upstream turbine wheel assembly 22 moving through a primary gas path 23 of the gas turbine engine 10 toward a downstream turbine wheel assembly 22. The vane-stage support 326 is configured to hold the turbine vane 344 and an inner vane seal land 346 included in the vane stage 324 in place relative to the turbine case 320.

The vane-stage support 326 includes a case mount 356, a spar 358, and case fasteners 360, 361 as shown in FIG. 5. The case mount 356 is arranged between a forward flange 334 of a forward casing 328 and an aft flange 340 of an aft casing 330 included in the turbine case 320. The spar 358 extends from the case mount 356 radially inward through an airfoil 348 of the turbine vane 344 included in the vane stage 324. The case fastener 360 extends axially forward and aft from the case mount 356 radially outward of the casing 320 and engages the forward and aft flanges 334, 340 of the turbine case 320 to couple the case mount 356 to the turbine case 320 and prevents radial inward movement of the case mount 356. The case fastener 361 extends axially through the forward flange 334, the aft flange 340, and the case mount 356 to couple the forward and aft flanges 334, 340 to the case mount 356 and block the forward and aft flanges 334, 340 of the case 320 from moving axially away from one another.

The case mount 356 includes the coupling flange 362, a retainer ring 364, and a plurality of clamp fasteners 366 as shown in FIG. 5. The coupling flange 362 is arranged between the forward flange 334 of the forward casing 328 and the aft flange 340 of the aft casing 330. The retainer ring 364 is spaced axially from the coupling flange 362 with a portion of the spar 358 sandwiched therebetween. The plurality of clamp fasteners 366 are configured to fix the spar 58 between the coupling flange 362 and the retainer ring 364.

In some embodiments, the coupling flange 362 and the retainer ring 364 are integrally formed as a one-piece, integral component. The one-piece integral coupling flange 362 and retainer ring 364 may be annular and arranged to extend around the axis 11.

In some embodiments, the integral coupling flange 362 and retainer ring 364 may be formed to include a plurality of spar-receiving cavities 365 that extends radially through the case mount 356. The cavities 365 are spaced-apart circumferentially from one another with respect to the axis 11. Each cavity 365 is configured to receive a portion of the spar 358.

In the illustrative embodiment, the retaining ring 364 engages a radially-inner diameter of the case 320 at a location axially downstream along the primary gas path 23 of the gas turbine engine 10 from the coupling flange 362. The retaining ring 364 in combination with the case fastener 360 carries cantilevered forces from the vane stage 324 to the case 320 during use of the turbine assembly 318 in the gas turbine engine 10. The coupling flange 362 and the retaining ring 364 together form an annular cavity 368 between the case 320 and the case mount 356 and extending around the axis 11, which may be supplied cooling air used to cool the turbine assembly 318.

The plurality of clamp fasteners 366 include a radial outer clamp fastener 370 and a radial inner clamp fastener 372 as shown in FIG. 5. The radial outer clamp fastener 370 extends through a portion of the spar 358 extending into the cavity 368 and prevents radial inward movement of the spar 358 out of the spar-receiving cavity 365. The radial inner clamp fastener 372 extends through a portion of the spar radially inward of the coupling flange 362 and the retainer ring 364 and prevents radial outward movement of the spar 358 out of the spar-receiving cavity 365. The radial outer and inner clamp fasteners 370, 372 trap the portion of the spar 358 between the coupling flange 362 and the retainer ring 364 within the spar-receiving cavity 365 to fix the spar 358 to the case mount 356.

The spar 358 includes a rod 374, an outer load transfer collar 376, and an inner load transfer collar 378 as shown in FIG. 5. The rod 374 extends radially through the airfoil 348 of the turbine vane 344. In some embodiments, the rod 374 may be hollow and include cooling holes to transmit cooling air from the cavity 368 to the vane 344 and/or into the inter-disk cavity between the turbine wheels 22. The outer load transfer collar 376 extends axially forward and aft of the rod 374 and contacts the turbine vane 344 at a radially outer end of the turbine vane 344. The inner load transfer collar 378 spaced radially inwardly from the outer load transfer collar 376 and extends axially forward and aft of the rod 374 and contacts the turbine vane 344 a radially inner end of the turbine vane 344.

In the illustrative embodiment, a portion of the rod 374 included in the spar 358 is trapped between the coupling flange 362 and the retainer ring 364 to fix the spar 358 to the case mount 356. The portion of the rod 374 extends into the respective cavity 365 to fix the spar 358 to the case mount 356.

The plurality of clamp fasteners 366 are configured to clamp the portion of the rod 374 included in the spar 358 between the coupling flange 362 and the retainer ring 364. In the illustrative embodiment, the clamp fasteners 366 also prevent radially inward and outward movement of the spar 358 out of the spar-receiving cavity 365 relative to the axis 11 to fix the spar 358 to the case mount 356.

Figure 6:
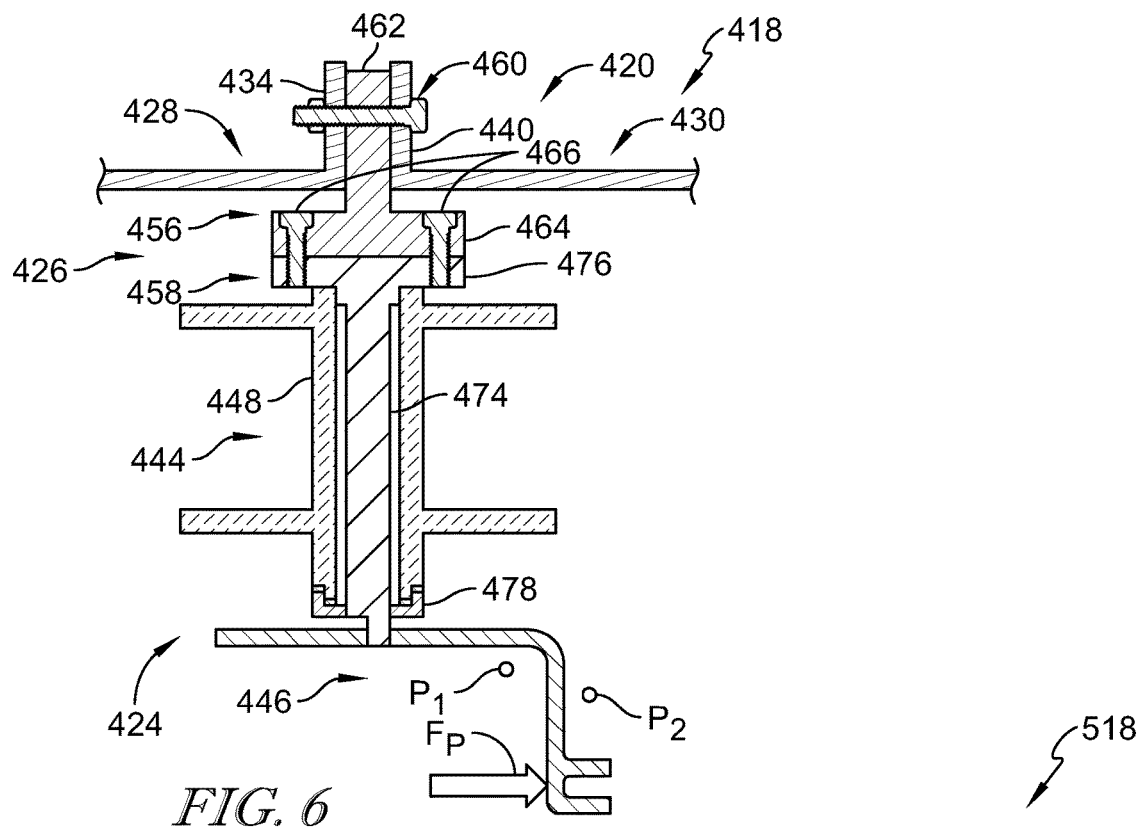
FIG. 6 is a detail view of another embodiment of a vane-stage support that may be included in the turbine assembly of FIG. 2 showing that the vane-stage support includes a case mount arranged between forward and aft flanges of the turbine case and a spar, and further showing that the case mount includes a coupling flange and a plurality of clamp fasteners that extends radially through the case mount and the spar to couple the spar to the coupling flange.

Another embodiment of a turbine assembly 418 in accordance with the present disclosure is shown in FIG. 6. The turbine assembly 418 is substantially similar to the turbine assembly 18 shown in FIGS. 1-3 and described herein. Accordingly, similar reference numbers in the 400 series indicate features that are common between the turbine assembly 18 and the turbine assembly 418. The description of the turbine assembly 18 is incorporated by reference to apply to the turbine assembly 418, except in instances when it conflicts with the specific description and the drawings of the turbine assembly 418.

The turbine assembly 418 includes a turbine case 420, a vane stage 424, and a vane-stage support 426 as shown in FIG. 6. The vane stage 424 is located between the turbine wheel assemblies 22 and includes a turbine vane 444 configured to redirect air received from an upstream turbine wheel assembly 22 moving through a primary gas path 23 of the gas turbine engine 10 toward a downstream turbine wheel assembly 22. The vane-stage support 426 is configured to hold the turbine vane 444 and an inner vane seal land 446 included in the vane stage 424 in place relative to the turbine case 420.

The vane-stage support 426 includes a case mount 456, a spar 458, and a case fastener 460 as shown in FIG. 6. The case mount 456 is arranged between a forward flange 434 of a forward casing 428 and an aft flange 440 of an aft casing 430 included in the turbine case 420. The spar 458 extends from the case mount 456 radially inward through an airfoil 448 of the turbine vane 444 included in the vane stage 424. The case fastener 460 extends through the forward flange 434 of the forward casing 428, the aft flange 440 of the aft casing 430, and a coupling flange 462 of the case mount 456 and are configured to clamp the coupling flange 462 between the forward flange 434 of the forward casing 428 and the aft flange 440 of the aft casing 430 to couple the case mount 456 directly to the turbine case 420.

The case mount 456 includes the coupling flange 462, a retainer ring 464, and a plurality of clamp fasteners 466 as shown in FIG. 6. The coupling flange 462 is arranged between the forward flange 434 of the forward casing 428 and the aft flange 440 of the aft casing 430. The retainer ring 464 extends axially forward and aft of the coupling flange 462. The plurality of clamp fasteners 466 are configured to clamp the spar 458 to the retainer ring 464 axially forward and aft of the coupling flange 462. In the illustrative embodiment, the plurality of clamp fasteners 466 extend radially through the retainer ring 464 and the spar 458.

The spar 458 includes a rod 474, an outer load transfer collar 476, and an inner load transfer collar 478 as shown in FIG. 6. The rod 474 extends radially through the airfoil 448 of the turbine vane 444. In some embodiments, the rod 474 may be hollow and include cooling holes to transmit cooling air to the vane 444 and/or into the inter-disk cavity between the turbine wheels 22. The outer load transfer collar 476 extends axially forward and aft of the rod 474 and contacts the turbine vane 444 at a radially outer end of the turbine vane 444. The inner load transfer collar 478 spaced radially inwardly from the outer load transfer collar 476 and extends axially forward and aft of the rod 474 and contacts the turbine vane 444 a radially inner end of the turbine vane 444.

In the illustrative embodiment, the outer load transfer collar 476 is coupled to the retainer ring 464 by the plurality of clamp fasteners 466. The plurality of clamp fasteners 466 extend radially through the outer load transfer collar 476 and the retainer ring 464 axially forward and aft of the coupling flange 462 and are configured to clamp the outer load transfer collar 476 to the retainer ring 464.

Figure 7:
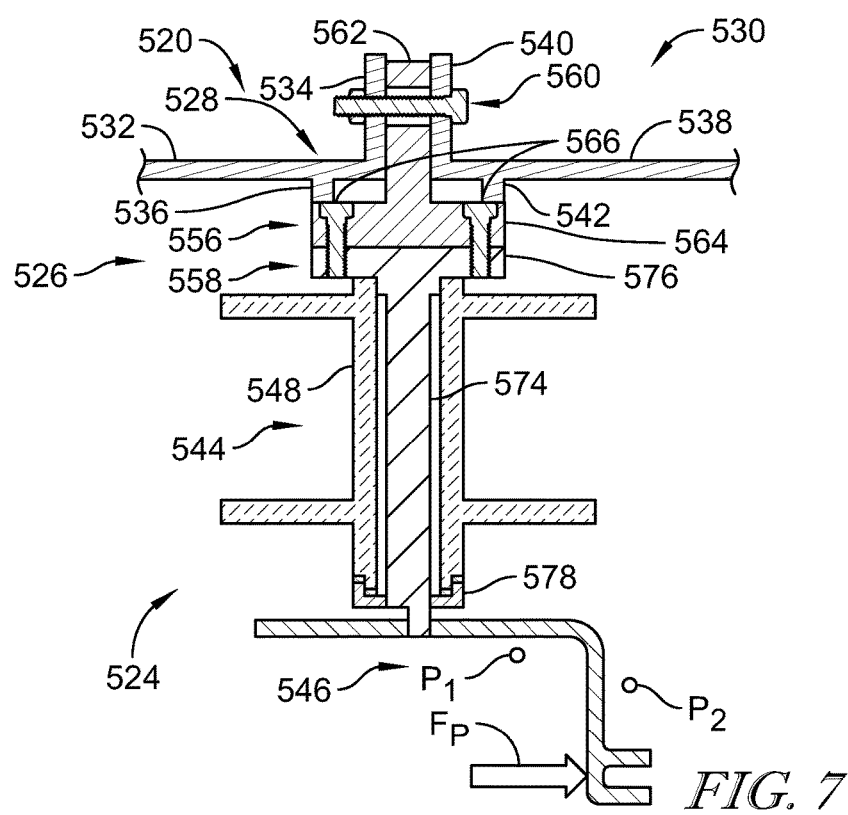
FIG. 7. is a detail view of another embodiment of a vane-stage support that may be included in the turbine assembly of FIG. 2 showing that the vane-stage support includes a case mount arranged between forward and aft flanges of the turbine case and a spar, and further showing that the case includes forward and aft end stops that contact the case mount to transfer circumferential loads from the turbine assembly during use of the gas turbine engine.

Another embodiment of a turbine assembly 518 in accordance with the present disclosure is shown in FIG. 7. The turbine assembly 518 is substantially similar to the turbine assembly 18 shown in FIGS. 1-3 and described herein. Accordingly, similar reference numbers in the 500 series indicate features that are common between the turbine assembly 18 and the turbine assembly 518. The description of the turbine assembly 18 is incorporated by reference to apply to the turbine assembly 518, except in instances when it conflicts with the specific description and the drawings of the turbine assembly 518.

The turbine assembly 518 includes a turbine case 520, a vane stage 524, and a vane-stage support 526 as shown in FIG. 7. The vane stage 24 is located between the turbine wheel assemblies 22 and includes a turbine vane 544 configured to redirect air received from an upstream turbine wheel assembly 22 moving through a primary gas path 23 of the gas turbine engine 10 toward a downstream turbine wheel assembly 22. The vane-stage support 526 is configured to hold the turbine vane 544 and an inner vane seal land 546 included in the vane stage 524 in place relative to the turbine case 520.

The turbine case 520 includes a forward casing 528 and an aft casing 530 as shown in FIG. 7. The forward casing 528 includes a forward annular shell 532, a forward flange 534 that extends radially outwardly from the annular shell 532, and a forward locating shoulder 536 that extends radially inwardly from the annular shell 532 and is spaced axially forward of the forward flange 534. The aft casing 530 includes an aft annular shell 538, an aft flange 540 that extends radially outwardly from the annular shell 538, and an aft locating shoulder 542 that extends radially inward from the annular shell 538 and is spaced axially aft of the aft flange 540. The forward and aft locating shoulders 536, 542 are arranged to engage a case mount 556 of the vane-stage support 526 to transfer circumferential loads from the turbine assembly 518 during use of the gas turbine engine 10.

The vane-stage support 526 includes a case mount 556, a spar 558, and a case fastener 560 as shown in FIG. 7. The case mount 556 is arranged between the forward flange 534 of the forward casing 528 and the aft flange 540 of the aft casing 530. The spar 558 extends from the case mount 556 radially inward through the airfoil 548 of the turbine vane 544 included in the vane stage 524. The case fastener 560 extends through the forward flange 534 of the forward casing 528, the aft flange 540 of the aft casing 530, and a coupling flange 562 of the case mount 556 and are configured to clamp the coupling flange 562 between the forward flange 534 of the forward casing 28 and the aft flange 540 of the aft casing 530 to couple the case mount 556 directly to the turbine case 520.

The case mount 556 includes the coupling flange 562, a retainer ring 564, and a plurality of clamp fasteners 566 as shown in FIG. 7. The coupling flange 562 is arranged between the forward flange 534 of the forward casing 528 and the aft flange 540 of the aft casing 530. The retainer ring 564 extends axially forward and aft of the coupling flange 562. The plurality of clamp fasteners 566 are configured to clamp the spar 558 to the retainer ring 564 axially forward and aft of the coupling flange 562. In the illustrative embodiment, the plurality of clamp fasteners 566 extend radially through the retainer ring 564 and the spar 558.

In the illustrative embodiment, the retainer ring 564 engages the forward and aft end stops 536, 542. The forward locating shoulder 536 engages a forward end of the retainer ring 564 and the aft locating shoulder 542 engages an aft end of the retainer ring 564 to carry cantilevered forces from the vane stage 524 to the case 520 during use of the turbine assembly 518.

The spar 558 includes a rod 574, an outer load transfer collar 576, and an inner load transfer collar 578 as shown in FIG. 7. The rod 574 extends radially through the airfoil 548 of the turbine vane 544. In some embodiments, the rod 574 may be hollow and include cooling holes to transmit cooling air to the vane 544 and/or into the inter-disk cavity between the turbine wheels 22. The outer load transfer collar 576 extends axially forward and aft of the rod 574 and contacts the turbine vane 544 at a radially outer end of the turbine vane 544. The inner load transfer collar 578 spaced radially inwardly from the outer load transfer collar 576 and extends axially forward and aft of the rod 574 and contacts the turbine vane 544 a radially inner end of the turbine vane 544.

In the illustrative embodiment, the outer load transfer collar 576 is coupled to the retainer ring 564. The plurality of clamp fasteners 566 extend through the outer load transfer collar 576 and the retainer ring 564 axially forward and aft of the coupling flange 562 and are configured to clamp the outer load transfer collar 576 to the retainer ring 564.

The present disclosure teaches using a flange closure in the casing 20, 220, 320, 420, 520 as a means of locating ceramic matrix composite vanes 44, 244, 344, 444, 544, which allows aerodynamic and axial loads to be transferred to the casing 20, 220, 320, 420, 520. The use of an existing flange in the turbine case 20, 220, 320, 420, 520 removes any requirement to make additional holes in the casing 20, 220, 320, 420, 520. Additionally, the flange connection limits complex casing geometries and profiles as may be required otherwise to secure the ceramic matrix composite vanes 44, 244, 344, 444, 544. Additionally, the flange arrangement for attachment gives additional flexibility and access during build and maintenance operations.

In metallic vanes embodiments, the metallic vanes are supported with a series of hooks and rails. In some metallic embodiments, the nozzle guide vane structure is supported on hooks and/or rails attached to the outer platform. However, the hook/rail design does not work for structures manufactured from the lower strength SiC/SiC ceramic matrix composite materials. Therefore, in some ceramic matrix composite vanes embodiments, a metallic spar is often incorporated in addition to conventional hook/rail joints.

The present disclosure teaches transferring the load from the nozzle guide vanes 44, 244, 344, 444, 544 outboard to the turbine casing 20, 220, 320, 420, 520. In the illustrative embodiments, the aerodynamic loading is transferred at both the inner and outer extents of the vane 44, 244, 344, 444, 544. The load may be transmitted through a metallic structure or spar 58, 258, 358, 458, 558 out into the casing 20, 220, 320, 420, 520. An illustrative example is shown in FIG. 3.

In the illustrative embodiment, the spar 58, 258, 358, 458, 558 is rigidly connected at the outer and features a sliding joint 78, 378, 478, 578 at the inner. Although, in other embodiments, the vane may incorporate a sliding outer fixture and rigid inner attachment.

The present disclosure also teaches how the spar 58, 258, 358, 458, 558 may be fixed to the casing 20, 220, 320, 420, 520. In some embodiments, as shown in FIG. 3 is to make use of a flange connection on the casing 20, 220, 320, 420, 520 which, when driven closed (using bolts or alternative suitable mechanical fastener) compressively traps a length of material which could then in turn be used to fix the spar 58, 258, 358, 458, 558.

The present disclosure also teaches a ceramic composite vane 44, 244, 344, 444, 544 arrangement that minimizes the deflection of the metallic structure 26, 226, 326, 426, 526 to avoid opening gaps at the ceramic matrix composite vane/blade interfaces (increasing leakage). The aerodynamic loading on the airfoil 48, 248, 348, 448, 548 and the stage loading applied to the interstage seal 46, 246, 346, 446, 546 creates an axial moment that may form gaps between the ceramic vane and the blade interfaces. Therefore, to minimize the deflection in this configuration, the radial engagement between the spar length of material and the casing 20, 220, 320, 420, 520 should be maximized.

In the illustrative embodiment, the spar attachment 56, 256, 356, 456, 556 to the casing 20, 220, 320, 420, 520 by maximizing the spar length allows a tuneable casing attachment to be adopted. The tuneable casing attachment feature may be maximized by, for example, increasing the axial interface length of the spar to attachment feature 56, 256, 356, 456, 556 to give a greater second moment of area and reduce the possibility of disengagement from the casing flange during thermal or mechanical movements.

An additional advantage of this approach is that the spar 58, 258, 358, 458, 558 can be hollow with one or more passages to allow coolant to transit from the outer cavity to cool the CMC, or to transit through to the intra-disc cavity. High pressure air may be supplied into each individual spar 58, 258, 358, 458, 558. As such, in the event of damage to vanes 44, 244, 344, 444, 544, cooling air may be uninterrupted to the remaining intact vanes 44, 244, 344, 444, 544.

Alternatively, if full annular ring was used with periodic attached vane spars 58, 258, 358, 458, 558, then a shared annular cavity 68, 268, 368, 568 may be used to introduce the high pressure air which would require fewer supply passages. Such a cavity 68, 268, 368, 568 is illustrated in FIGS. 3-5 just above the vane spar 58, 258, 358, 458, 558. The shared cavity 68, 268, 368, 568 improves the mixing of the cooling air prior to entering the spar 58, 258, 358, 458, 558 when compared to a direct supply option, which may result in more predictable, uniform cooling.

A further advantage of using a metallic structure 26, 226, 326, 426, 526 to support the vane 44, 244, 344, 444, 544 is that a degree of axial pre-lean of the vane spar 58, 258, 358, 458, 558 and hence vane assembly may be incorporated into the design. This may help to optimize clearances across the running range and improve the interface with the rotating components.

In the illustrative embodiment, the case mount 56, 256, 356, 456, 556 is an annular feature. However, in some embodiments the case mount 56, 256, 356, 456, 556 may be segmented, which may reduce the weight of the component. If segmented, careful consideration of sealing the high pressure coolant to minimize leakage of the fluid to outside of the high pressure turbine casing 20, 220, 320, 420, 520 would be required.

In the illustrative embodiment of FIG. 4, a threaded bolt 260 is used to attach the vane spar 258 to the casing attachment feature 256 by arranging the bolt 260 axially through both components. In other embodiments, alternative suitable mechanical fasteners may be used.

In the illustrative embodiment of FIG. 5, pins 370, 372 are used an alternative to attach the spar 358 to the case mount 356. The pins 370, 372 extend through the rod 374 of the spar 358 at the outer and inner interface with the casing attachment feature 356.

In some embodiments, the existing flange closure bolts 260, 460, 560 may extend through any casing attachment feature 256, 456, 556. This arrangement serves an additional layer of protection to prevent detachment from the casing 220, 420, 520.

However, FIG. 3 shows an arrangement where one of the flange bolts 60 does not interface with the attachment feature 62, relying instead on compressive strength and location features for location. In the illustrative embodiment, a clearance hole is formed in the coupling flange so that the flange bolt 60 does not interface with the attachment feature 62. In some embodiments, where only one flange bolt 560 is used like in FIG. 7, the clearance may also be formed in the coupling flange 562 so that none of the bolts 560 engages the attachment feature 362. In some embodiments, where only one flange bolt is used, every other flange bolt may have the clearance so that the bolt does not interface the attachment feature.

In the illustrative embodiment of FIGS. 6 and 7, the influence on adjacent features can adjusted by changing the width of the attachment feature 456, 556. For example, the case mount 456, 556 and the outer load transfer feature 476, 576 may be extended horizontally to allow metal to metal sealing against adjacent seal segment assemblies, thus reducing the sealing challenge associated with the ceramic matrix composite to metal thermal expansion mismatch.

In the illustrative embodiment of FIG. 7, the axial load is reacted on the vane assembly 544 by transferring it to the casing 520 through casing end stops, or "pips" 536, 542. The end stops 536, 542 may be configured to allow a small axial rotation before resisting any further movement. In some embodiments, the pips may be positioned in-front of and behind the vane assembly 544 to transfer circumferential loads to the casing 520. To further help with the circumferential load transfer, the bolts 566 may be extended to also pass through the casing 520.

In the illustrative embodiment of FIG. 6, the vane-stage support 426 arrangement may allow an assembly process to first, build the rotor stack with interstage seal 446 in-situ. Then the ceramic matrix composite ring would be brought around the perimeter of the interstage seal 446. Next, the flange would be brought around the perimeter of the ceramic matrix composite vane ring and attached. Finally, the aforementioned flange would be attached to the remaining casing flanges.

The present disclosure teaches a simplified manufacturing options, although the detailed manufacturing route will depend largely on the casing attachment option selected. The metallic attachment features 26, 226, 326, 426, 526 may be forged and/or machined. The material used may be a high temperature capable metallic alloy such as a nickel alloy or, if the environment was cool enough, potentially Waspalloy or Hastelloy. C263 may be used if the forged manufacturing route was selected. Again, depending on the geometry, the parts may be extruded.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine with a turbine vane comprising ceramic matrix composite materials configured to redirect air moving through a primary gas path of the gas turbine engine, the assembly comprising:
a turbine case arranged around a central axis, the turbine case including (i) a forward casing with an annular shell and a forward flange that extends radially outwardly from the annular shell and (ii) an aft casing with an annular shell and an aft flange that extends radially outwardly from the annular shell,
a vane stage including (a) the turbine vane comprising ceramic matrix composite materials shaped to form an airfoil that extends across the primary gas path of the gas turbine engine and (b) an inner vane seal land located radially inward of the turbine vane, the inner vane seal land configured to be engaged by a rotating component to create a seal that separates pressure zones within the gas turbine engine when the turbine assembly is used in the gas turbine engine, and
a vane-stage support comprising metallic materials that is configured to hold the turbine vane and the inner vane seal land in place relative to the turbine case, the vane-stage support including (1) a case mount arranged between the forward flange of the forward casing and the aft flange of the aft casing and (2) a spar that extends from the case mount radially through the airfoil of the turbine vane, wherein the turbine vane and the inner vane seal land engage the spar so that forces applied to the vane stage are carried by the spar to the case mount and the turbine case during use of the turbine assembly in the gas turbine engine,
wherein the case mount includes a coupling flange arranged between the forward flange of the forward casing and the aft flange of the aft casing, a retainer ring spaced axially from the coupling flange with a portion of the spar sandwiched therebetween, and a plurality of clamp fasteners configured to clamp the spar between the coupling flange and the retainer ring,
wherein the plurality of clamp fasteners extend through the portion of the spar sandwiched between the coupling flange and the retainer ring, and
wherein the vane-stage support includes a plurality of case fasteners that extend through the forward flange of the forward casing, the aft flange of the aft casing, and the coupling flange of the case mount, and wherein the case fasteners are configured to clamp the coupling flange between the forward flange of the forward casing and the aft flange of the aft casing.

2. The assembly of claim 1, wherein the retainer ring engages a radially-inner diameter of the case at a location spaced axially from the coupling flange so as to carry cantilevered forces from the vane stage to the turbine case during use of the turbine assembly in the gas turbine engine.

3. The assembly of claim 2, wherein the retainer ring is spaced axially downstream along the primary gas path from the coupling flange.

4. The assembly of claim 1, wherein the spar of the vane-stage support includes a rod that extends radially through the airfoil of the turbine vane, an outer load transfer collar that extends axially forward and aft of the rod and contacts the turbine vane, and an inner load transfer collar spaced radially inwardly from the outer load transfer collar that extends axially forward and aft of the rod and contacts the turbine vane.

5. The assembly of claim 4, wherein a portion of the rod included in the spar is trapped between the coupling flange and the retainer ring to fix the spar to the case mount.

6. A turbine assembly, the assembly comprising:
a turbine case arranged around a central axis, the turbine case including a forward casing with a forward flange that extends radially outwardly and an aft casing with an aft flange that extends radially outwardly,
a turbine vane comprising ceramic matrix composite materials shaped to form an airfoil,
an inner vane seal land located radially inward of the turbine vane, and
a vane-stage support configured to hold the turbine vane and the inner vane seal land in place relative to the turbine case, the vane-stage support including a case mount clamped between the forward flange of the forward casing and the aft flange of the aft casing and a spar that extends from the case mount radially through the airfoil of the turbine vane to the inner vane seal land, wherein the spar supports the inner vane seal land so that forces applied to the inner vane seal land are carried by the spar to the case mount and the turbine case during use of the turbine assembly in a gas turbine engine, wherein the case mount includes a coupling flange arranged between the forward flange of the forward casing and the aft flange of the aft casing and a retainer ring spaced axially from the coupling flange with a portion of the spar sandwiched therebetween, and wherein the retainer ring engages a radially-inner diameter of the turbine case at a location spaced axially from the coupling flange.

7. The assembly of claim 6, wherein the vane-stage support further includes a plurality of clamp fasteners that extend through the portion of the spar sandwiched between the coupling flange and the retainer ring.

8. The assembly of claim 7, wherein the vane-stage support includes a plurality of case fasteners that extend through the forward flange of the forward casing, the aft flange of the aft casing, and the coupling flange of the case mount, and wherein the case fasteners are configured to clamp the coupling flange between the forward flange of the forward casing and the aft flange of the aft casing.

9. The assembly of claim 6, wherein the retainer ring is spaced axially downstream along a primary gas path of the gas turbine engine from the coupling flange.

10. The assembly of claim 6, wherein the spar of the vane-stage support includes a rod that extends radially through the airfoil of the turbine vane and load-transfer features that extend axially from the rod to engage the turbine vane and carry load from the turbine vane to the case mount and the turbine case.

11. The assembly of claim 10, wherein a portion of the rod included in the spar is trapped between the coupling flange and the retainer ring to fix the spar to the case mount.

12. The assembly of claim 11, wherein the case mount includes a plurality of clamp fasteners configured to clamp the portion of the rod included in the spar between the coupling flange and the retainer ring.

13. The assembly of claim 11, wherein the location the retainer ring engages the radially-inner diameter of the turbine case at a location is spaced axially downstream along a primary gas path of the gas turbine engine from the coupling flange.

14. A turbine assembly, the assembly comprising:
a turbine case arranged around a central axis, the turbine case including a forward casing with a forward flange that extends radially outwardly and an aft casing with an aft flange that extends radially outwardly,
a turbine vane comprising ceramic matrix composite materials shaped to form an airfoil,
an inner vane seal land located radially inward of the turbine vane, and
a vane-stage support configured to hold the turbine vane and the inner vane seal land in place relative to the turbine case, the vane-stage support including a case mount clamped between the forward flange of the forward casing and the aft flange of the aft casing, a spar that extends from the case mount radially through the airfoil of the turbine vane to the inner vane seal land, and a plurality of case fasteners that couple the case mount to the case, wherein the plurality of case fasteners extend through the forward flange of the forward casing, the aft flange of the aft casing, and the case mount, the plurality of case fasteners are configured to clamp the case mount between the forward flange of the forward casing and the aft flange of the aft casing, and the spar supports the inner vane seal land so that forces applied to the inner vane seal land are carried by the spar to the case mount and the turbine case during use of the turbine assembly in a gas turbine engine.

15. The assembly of claim 14, wherein the plurality of case fasteners includes a radially outer securing bolt that extends through the forward flange of the forward casing, the aft flange of the aft casing and the case mount and a radially inner securing bolt spaced radially inward of the radially outer securing bolt that extends through the forward flange of the forward casing, the aft flange of the aft casing and the case mount, and wherein the case mount includes a fastener hole that extends axially through the case mount, the radially outer secure bolt extends through the fastener hole, and a portion of an outer surface of the radially outer securing bolt is spaced apart from the fastener hole in the case mount.

16. The assembly of claim 14, wherein the case mount includes a coupling flange arranged between the forward flange of the forward casing and the aft flange of the aft casing and a retainer ring spaced axially from the coupling flange with a portion of the spar sandwiched therebetween.

17. The assembly of claim 16, wherein the vane-stage support further includes a plurality of clamp fasteners that extend through the portion of the spar sandwiched between the coupling flange and the retainer ring.

18. The assembly of claim 14, wherein the spar of the vane-stage support includes a rod that extends radially through the airfoil of the turbine vane and load-transfer features that extend axially from the rod to engage the turbine vane and carry load from the turbine vane to the case mount and the turbine case.

19. The assembly of claim 18, wherein the case mount includes a plurality of clamp fasteners configured to clamp a portion of the rod included in the spar between a coupling flange and a retainer ring.

20. The assembly of claim 14, wherein the case mount includes a coupling flange arranged between the forward flange of the forward casing and the aft flange of the aft casing a retainer ring that extends forward and aft from the coupling flange, and a plurality of clamp fasteners that clamp the spar to the retainer ring, and the plurality of clamp fasteners extend radially through the retainer ring and the spar axially forward and aft of the coupling flange.

* * * * *